United States Patent
Steben et al.

(10) Patent No.: US 11,606,329 B1
(45) Date of Patent: Mar. 14, 2023

(54) SYSTEMS AND METHODS FOR PERFORMANCE MONITORING OF SERVICE MESH-BASED ENVIRONMENTS

(71) Applicant: Verizon Patent and Licensing Inc., Basking Ridge, NJ (US)

(72) Inventors: Jerry Steben, Forth Worth, TX (US); John P. Demko, McDonald, PA (US); Maqbool Chauhan, Keller, TX (US); Satish S. Vasamsetti, San Francisco, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/663,038

(22) Filed: May 12, 2022

(51) Int. Cl.
| | |
|---|---|
| *H04L 29/12* | (2006.01) |
| *H04L 29/06* | (2006.01) |
| *H04L 29/08* | (2006.01) |
| *H04L 61/2503* | (2022.01) |
| *H04L 67/10* | (2022.01) |

(52) U.S. Cl.
CPC .......... *H04L 61/2503* (2013.01); *H04L 67/10* (2013.01)

(58) Field of Classification Search
CPC .. H04L 61/2503; H04L 61/2514; H04L 67/10
USPC ........................................................ 709/245
See application file for complete search history.

(56) References Cited

U.S. PATENT DOCUMENTS

| | | | | |
|---|---|---|---|---|
| 8,194,680 B1* | 6/2012 | Brandwine | ......... | H04L 41/0816 370/398 |
| 8,644,188 B1* | 2/2014 | Brandwine | ........... | H04L 49/354 370/254 |
| 8,966,027 B1* | 2/2015 | Brandwine | ......... | H04L 61/2503 709/200 |
| 10,904,201 B1* | 1/2021 | Ermagan | ............. | H04L 61/5076 |
| 10,958,478 B2* | 3/2021 | Krause | ................ | H04L 12/4641 |
| 2015/0281111 A1* | 10/2015 | Carl | .................... | H04L 61/4511 709/226 |
| 2020/0162421 A1* | 5/2020 | Lo | ........................ | H04L 67/1001 |
| 2022/0188237 A1* | 6/2022 | Cariello | ............. | G06F 12/0891 |

OTHER PUBLICATIONS

Sachin Manpathak, "Kubernetes Service Mesh: A Comparison of Istio, Linkerd, and Consul," https://platform9.com/blog/kubernetes-service-mesh-a-comparison-of-istio-linkerd-and-consul/ (visited Apr. 25, 2022).
Kubernetes Documentation, "Services, Load Balancing, and Networking," https://kubernetes.io/docs/concepts/services-networking/_print/ (visited Apr. 27, 2022).

* cited by examiner

*Primary Examiner* — Ruolei Zong

(57) ABSTRACT

A system described herein may provide a technique for providing updated address mapping information associated with a service mesh via which one or more containerized instances communicate. The system may include and/or implement an application programming interface ("API") via which the service mesh may provide address mapping information, that includes public and private addresses associated with containerized instances that communicate via the service mesh. The updated information may be received on an ongoing basis, and may be provided to another system that has subscribed to receiving updated mapping information associated with one or more containerized instances.

20 Claims, 10 Drawing Sheets

SYSTEMS AND METHODS FOR PERFORMANCE MONITORING OF SERVICE MESH-BASED ENVIRONMENTS

BACKGROUND

Virtualized and/or containerized environments may be used to provide virtualized instances of network functions ("NFs") of a core of a wireless network, applications, and/or services on shared resources that are managed by different cloud providers. Some such environments may include a service mesh, which provides for communications between virtualized instances or containers, as well as with external devices or systems that communicate with such virtualized instances or containers. The service mesh may serve as an abstraction layer for one or more communication interfaces and/or pathways, such that an entity deploying, designing, implementing, etc. such virtualized instances or containers need not design or specifically implement such communication interfaces and/or pathways.

DETAILED DESCRIPTION OF EXAMPLE EMBODIMENTS

The following detailed description refers to the accompanying drawings. The same reference numbers in different drawings may identify the same or similar elements.

A service mesh in a virtualized and/or containerized environment may serve as an abstraction layer for one or more communication interfaces and/or pathways, such that an entity deploying, designing, implementing, etc. such virtualized instances or containers need not design or specifically implement such communication interfaces and/or pathways. For example, a set of virtualized instances, containers, etc. may be deployed in a containerized environment, and may communicate with each other and/or devices or systems that are external to the containerized environment via a service mesh. The virtualized instances may be deployed, implemented, managed, etc. by facilities that support virtualized instance and/or container lifecycle operations such as orchestration, deployment and scaling (for example, the open-source Kubernetes system).

Figure 1:
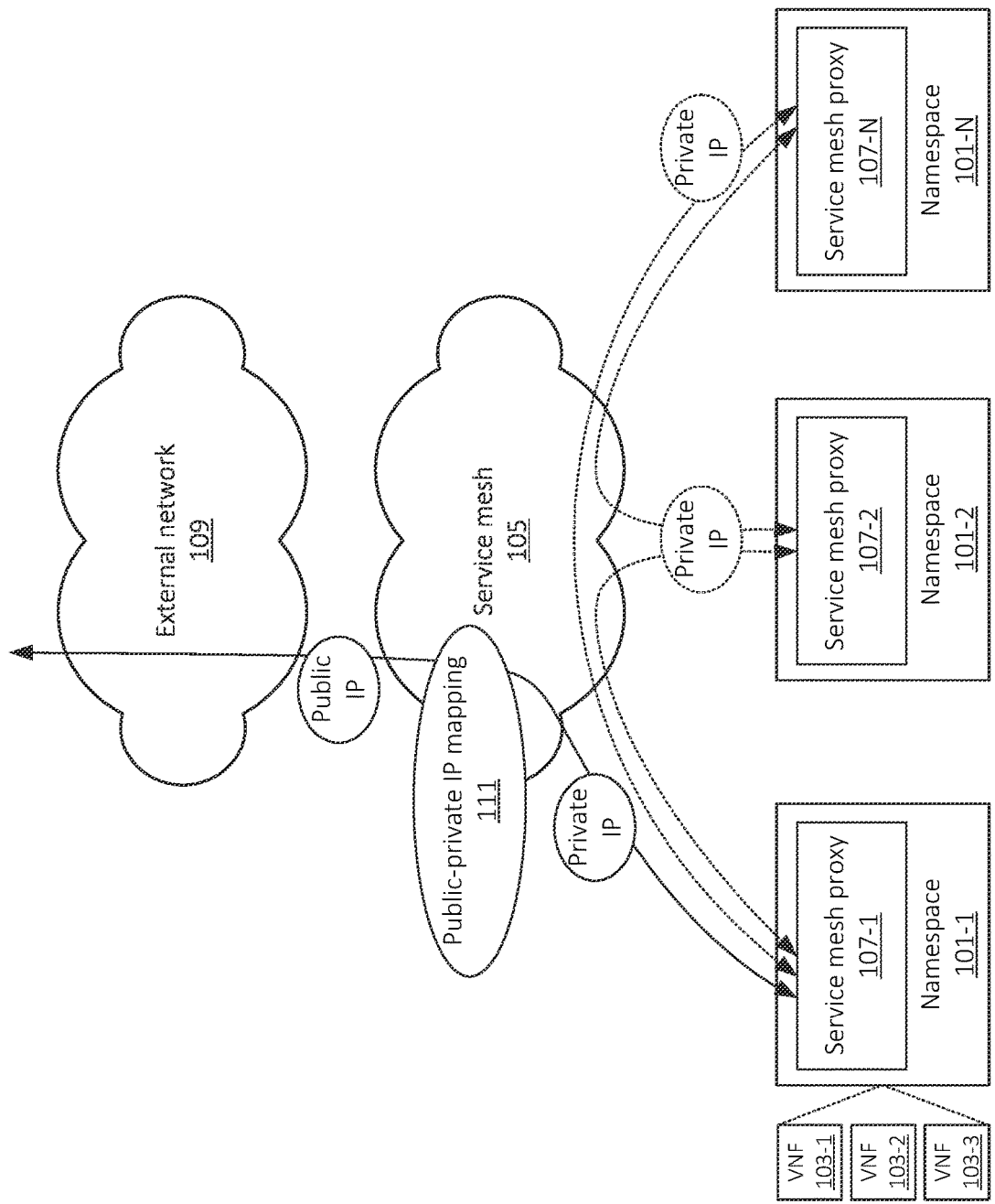
FIG. 1 illustrates an example arrangement of a service mesh and one or more containerized instances.

As shown in FIG. 1, namespaces 101-1 through 101-3 may each include one or more containers, virtualized instances, etc. In this example, namespace 101-1 includes example virtualized network functions ("VNFs") 103-1 through 103-3, which may be, may implement, may include, etc. VNFs associated with a core of a wireless network. Such VNFs may include one or more User Plane Functions ("UPFs"), Session Management Functions ("SMFs"), Unified Data Management functions ("UDMs"), or other types of VNFs. In some embodiments, each namespace 101 may include additional, fewer, and/or different types of containers, virtualized instances, etc. (e.g., other than VNFs). In some embodiments, each namespace 101 may be associated with one particular VNF or other type of virtualized instance or container.

In some embodiments, namespaces 101 may communicate with other namespaces 101 and/or other devices, systems, or networks via service mesh 105. For example, service mesh 105 may include virtual and/or physical routers, hubs, switches, or other types of functions that provide communication functionality for namespaces 101. Service mesh 105 may be associated with one or more application programming interfaces ("APIs"), software development kits ("SDKs"), etc. which may be implemented by namespaces 101 to allow namespaces 101 to communicate with each other and/or with one or more other devices or systems. For example, each namespace 101 may include an instance of service mesh proxy 107, which may implement and/or may otherwise be associated with one or more APIs associated with service mesh 105. Thus, an entity implementing, designing, deploying, etc. namespaces 101 and/or VNFs 103 may not need to design, implement, etc. communication pathways associated with such namespaces 101 and/or VNFs 103, as such communication pathways may be provided via service mesh proxy 107 and service mesh 105.

As such, respective namespaces 101 may communicate with each other via service mesh 105. For example, namespace 101-1 may communicate with namespace 101-2 using an identifier, name, label, etc. of namespace 101-2. Service mesh 105 may, for example, maintain a mapping of such identifiers, names, labels, etc. to Internet Protocol ("IP") addresses, ports, or other types of identifiers that may be used to provide communication capability to namespaces 101 that implement respective service mesh proxies 107. Such IP addresses may be "private" IP addresses, inasmuch as such private IP addresses may be used by service mesh 105 but may not be exposed to other devices, systems, or networks, such as external network 109. While discussed herein in the context of IP addresses, similar concepts may apply to ports, IP address/port combinations, and/or other identifiers.

Network 109 may be "external" to service mesh 105 and/or namespaces 101 inasmuch as communications via network 109 may utilize a different set of IP addresses (e.g., referred to as "public" IP addresses), ports, and/or other types of communication identifiers. As such, service mesh 105 may further maintain public-private IP mapping 111, which may be used by service mesh 105 to facilitate communications between respective namespaces 101 and devices or systems that are communicatively coupled to network 109 (e.g., User Equipment ("UEs"), application servers, content provider systems, monitoring systems, etc.). For example, public-private IP mapping 111 may be used by service mesh 105 to perform network address translation ("NAT"), port address translation ("PAT"), etc. for traffic sent to and/or received from respective namespaces 101.

As shown, namespace 101-1 may output traffic to or via network 109. For example, one or more VNFs 103 of namespace 101-1 may output egress traffic to service mesh proxy 107-1, which may provide such traffic to service mesh 105 along with a private IP address associated with namespace 101-1 (e.g., associated with service mesh proxy 107-1). Service mesh 105 may utilize public-private IP mapping 111 to determine a public IP address associated with namespace 101-1, and may output such traffic to a destination (e.g., as indicated in the traffic) via network 109, where outputting the traffic includes indicating the public IP address as a source of the traffic. Additionally, when receiving traffic from network 109 that indicates the public IP address associated with namespace 101-1, service mesh 105 may utilize public-private IP mapping 111 to determine a private IP address of namespace 101-1, and may forward such traffic to namespace 101-1 (e.g., to service mesh proxy 107-1) using such private IP address.

Figure 2:
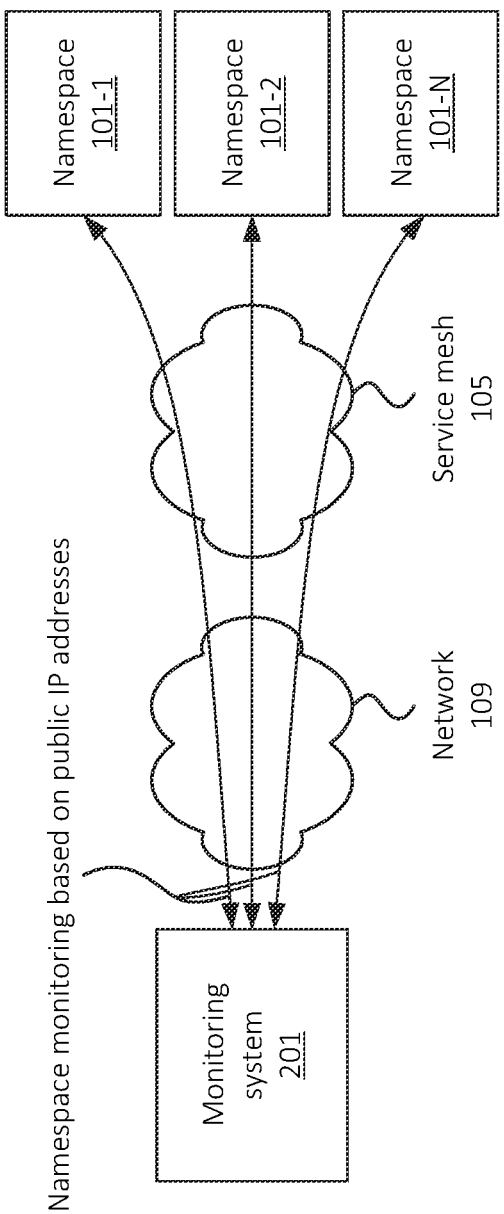
FIG. 2 illustrates an example monitoring of traffic associated with containerized instances based on public addresses associated with the containerized instances.

As shown in FIG. 2, an example system that may communicate with one or more namespaces 101 via network 109 and service mesh 105 may include monitoring system 201. For example, monitoring system 201 may receive traffic from namespaces 101-1 via network 109 and service mesh 105, and may monitor performance metrics (e.g., latency, throughput, etc.) and/or may generate other analytics based on receiving such traffic. Monitoring system 201 may be able to perform such monitoring on the basis of public IP addresses associated with namespaces 101, as private IP addresses associated with namespaces 101, as used by service mesh 105, may be unavailable to monitoring system 201.

Situations may occur, however, in which private IP address information may be useful in determining performance metrics and/or other analytics information associated with namespaces 101. For example, if a given set of namespaces 101 are experiencing degraded performance and are all associated with the same range of private IP addresses, such a situation may indicate an issue with service mesh 105 (e.g., where the range of private IP addresses may be associated with a particular set of functions, devices, etc. of service mesh 105). As another example, service mesh 105 may dynamically modify public-private IP mapping 111, such that a given namespace 101 may retain the same public IP address but may have dynamically changing private IP addresses at different times. In situations where performance metrics or other analytics fluctuate or vary as a function of changing private IP addresses, analyzing the relationship between the performance metrics/analytics and the private IP addresses may provide additional insight as to the performance of service mesh 105. In some embodiments, artificial intelligence/machine learning ("AI/ML") techniques or other suitable techniques may be used to identify such relationships between performance metrics/analytics and private IP address configurations of service mesh 105. Identifying such relationships may allow for remedial actions to be identified, such as quarantining, restarting, and/or otherwise modifying portions of service mesh 105, in order to improve the operation of service mesh 105.

Figure 3:
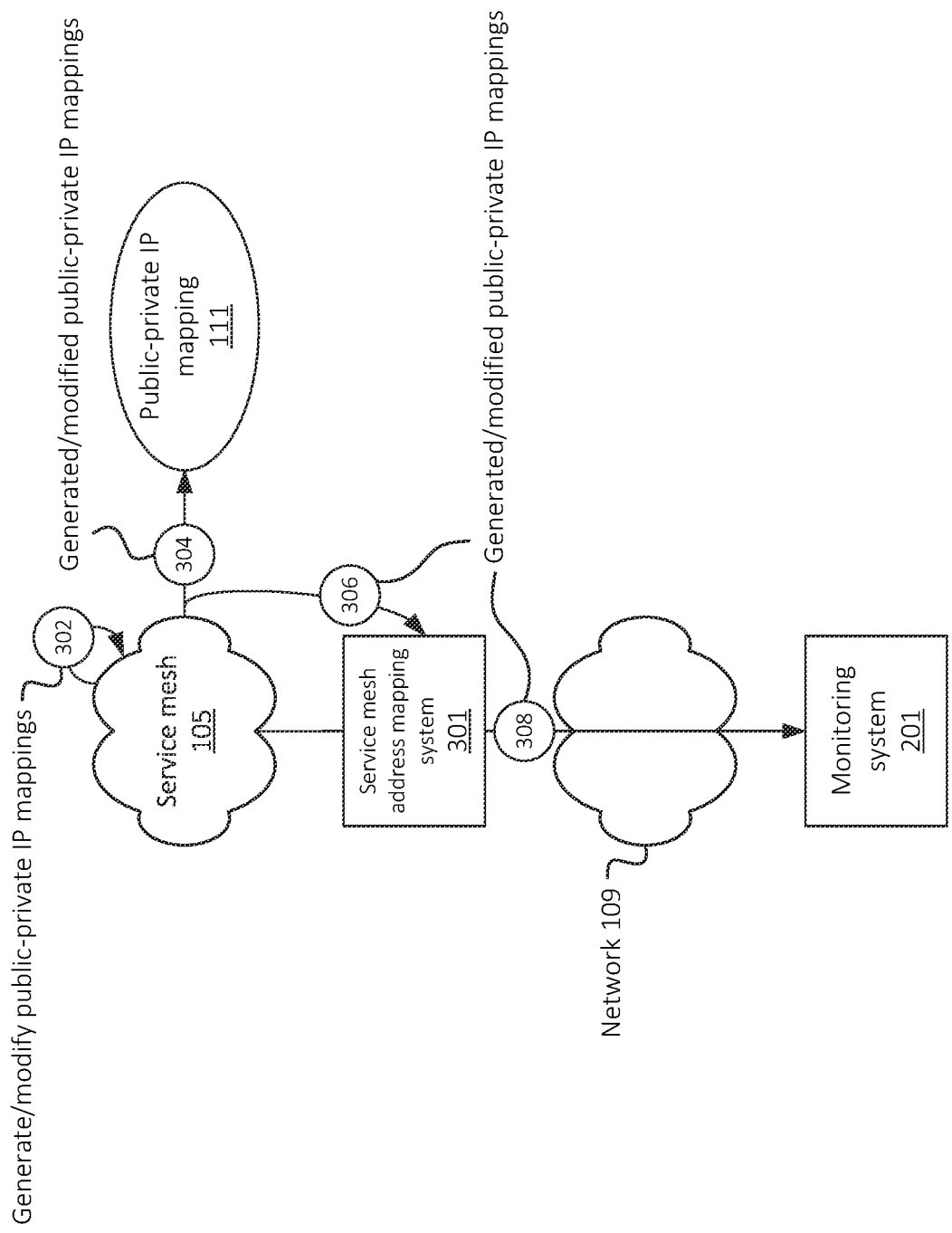
FIG. 3 illustrates an example of providing updated address mapping information associated with a service mesh via which one or more containerized instances communicate, in accordance with some embodiments.

As discussed below, some embodiments may provide for the exposure of private IP addresses (e.g., some or all of public-private IP mapping 111), associated with service mesh 105, to monitoring system 201 and/or other devices or systems, thereby allowing for enhanced performance metrics/analytics monitoring as well as for the performing of remedial actions based on such monitoring. For example, as shown in FIG. 3, service mesh 105 may include, implement, and/or otherwise be associated with Service Mesh Address Mapping System ("SMAMS") 301. SMAMS 301 may, for example, be implemented as a container, virtualized instance, and/or namespace of service mesh 105. Additionally, or alternatively, SMAMS 301 may include and/or may be implemented as an API associated with service mesh 105. For example, SMAMS 301 may be associated with a public IP address via which monitoring system 201 may communicate with SMAMS 301 via network 109. As discussed below, SMAMS 301 may provide some or all of the information included in public-private IP mapping 111 to monitoring system 201, which may include up-to-date mappings in situations where the public-private IP address mapping associated with a given namespace 101 is modified.

As shown, for example, service mesh 105 may generate and/or modify (at 302) public-private IP mapping information associated with one or more namespaces 101, which may include changing the private IP address for a given namespace 101 without modifying the public IP address for namespace 101, changing the public IP address for namespace 101 without modifying the private IP address for namespace 101, or changing both the public and private IP addresses for namespace 101. Service mesh 105 may further maintain (at 304) the generated and/or modified public-private IP mappings in public-private IP mapping 111 or some other suitable data structure. Thus, when sending and/or receiving traffic to and/or from one or more namespaces 101, service mesh 105 may use the updated public-private IP mapping 111 in order to properly route such traffic.

In accordance with some embodiments, service mesh 105 may also provide (at 306) the generated and/or modified public-private IP mapping information to SMAMS 301, based on which monitoring system 201 may receive (at 308) the generated and/or modified public-private IP mapping information. In this manner, monitoring system 201 may maintain private IP addresses of particular namespaces 101, along with their public IP addresses. In this manner, monitoring system 201 may be able to perform enhanced monitoring of such namespaces 101 as well as service mesh 105, which may provide additional insight as to whether remedial measures should be performed with respect to such namespaces 101 and/or service mesh 105 (e.g., to remedy Quality of Service ("QoS") issues, outages, etc.).

Figure 4:
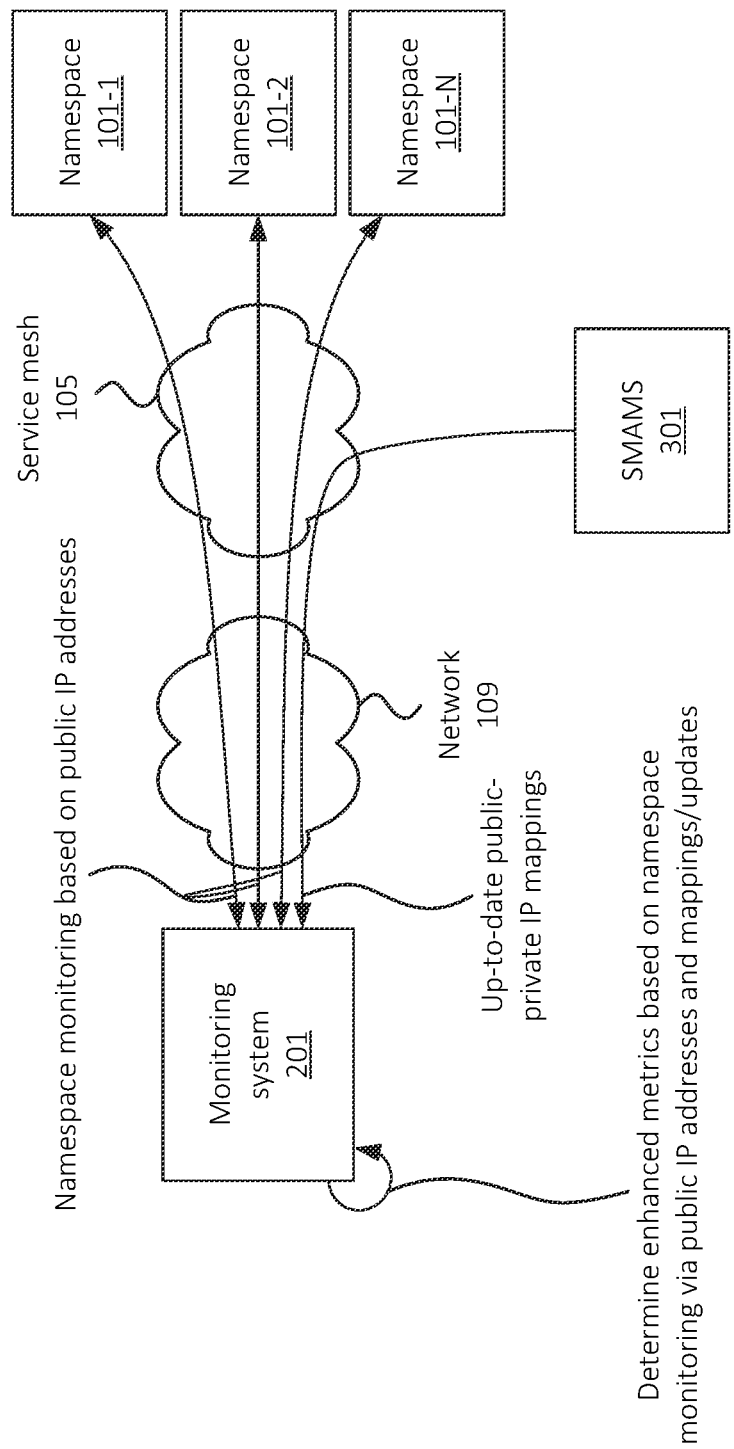
FIG. 4 illustrates an example of monitoring containerized instances and a service mesh via which the containerized instances communicate based on private addresses, in accordance with some embodiments.

As shown in FIG. 4, for example, in addition to monitoring performance metrics and/or other analytics associated with namespaces 101 on the basis of traffic associated with respective public IP addresses, monitoring system 201 may also receive up-to-date public-private IP mappings associated with such namespaces 101 from SMAMS 301. Monitoring system 201 may accordingly determine enhanced metrics associated with namespaces 101, which may include using AI/ML techniques or other suitable techniques to determine relationships between particular private IP addresses (and/or private IP address modifications), and metrics associated with traffic sent and/or received by namespaces 101 using their respective public IP addresses.

Figure 5:
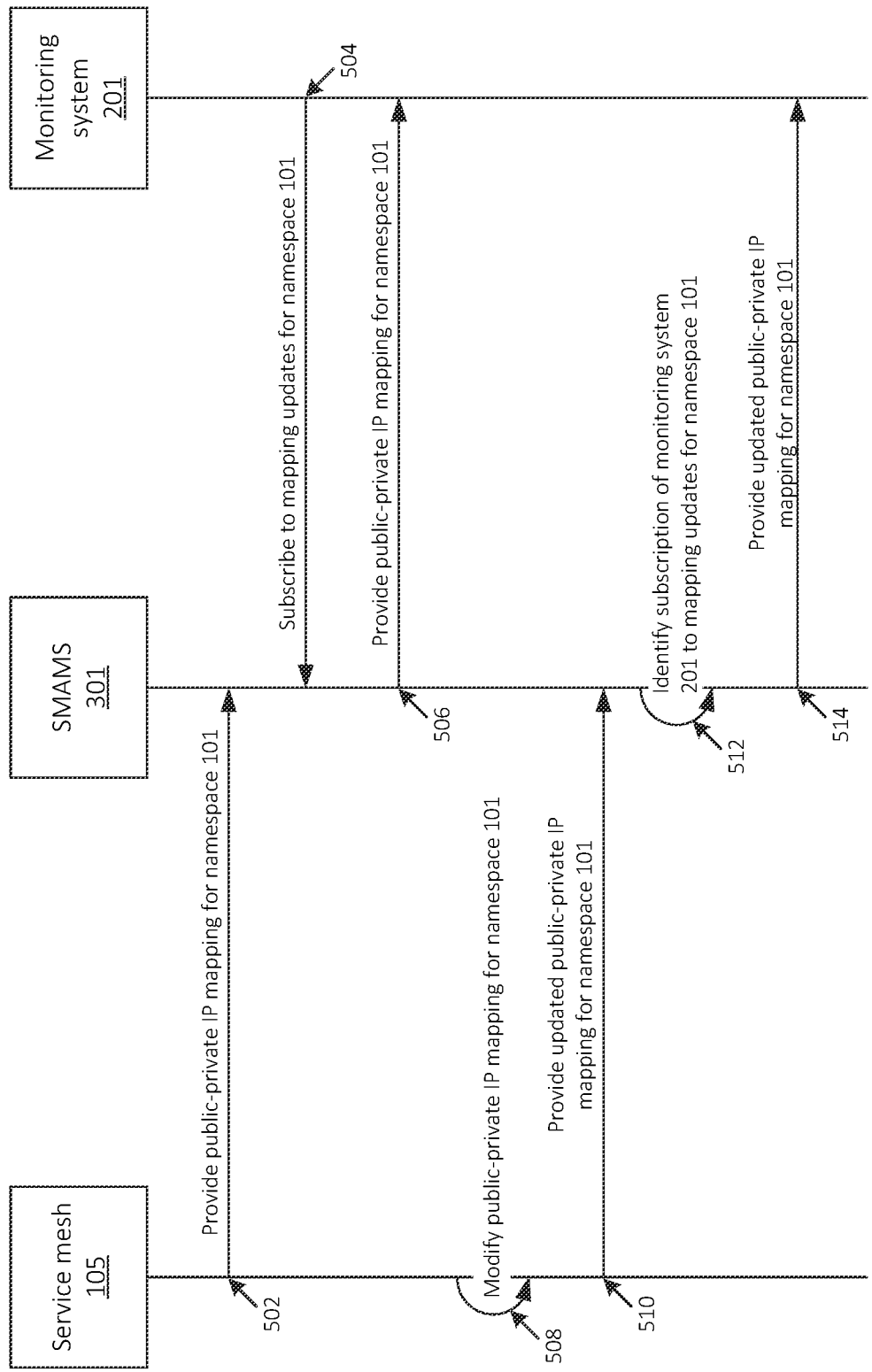
FIG. 5 illustrates an example signal flow for providing updated address mapping information associated with a service mesh via which one or more containerized instances communicate, in accordance with some embodiments.

FIG. 5 illustrates an example signal flow that may be used for the enhanced monitoring described above. As shown, service mesh 105 may provide (at 502) public-private IP mapping information, for a particular namespace 101, to SMAMS 301. In some embodiments, service mesh 105 may also provide (at 502) one or more other attributes, configuration parameters, etc. associated with namespace 101, such as a name, a VNF type (e.g., SMF, UPF, etc.), a service region identifier, etc.

Monitoring system 201 may subscribe (at 504) to public-private IP mapping updates associated with SMAMS 301. For example, monitoring system 201 may provide an identifier of namespace 101, such as a name, public IP address, or other suitable identifier of one or more namespaces 101. Additionally, or alternatively, monitoring system 201 may provide one or more categories, labels, types, etc. For example, monitoring system 201 may indicate that monitoring system 201 is subscribing to public-private IP mapping updates associated with a particular type of VNF associated with a particular entity or organization (e.g., SMFs that have been deployed by a particular wireless network provider). In some embodiments, SMAMS 301 may implement one or more suitable authentication and/or authorization procedures in order to verify that monitoring system 201 is authorized to receive the requested updates.

Based on the subscribing (at 504) of monitoring system 201 to mapping updates associated with namespace 101, SMAMS 301 may provide (at 506) the current public-private IP mapping, associated with namespace 101 (e.g., as received at 502), to monitoring system 201. In this manner, monitoring system 201 may be able to determine enhanced analytics associated with namespace 101 based on traffic associated with the public IP address of namespace 101, as well as based on the private IP address of namespace 101.

At some subsequent time, service mesh 105 may modify (at 508) the public-private IP mapping for namespace 101. For example, service mesh 105 may modify a set of functions, devices, etc. used to provide routing or other communication services for namespace 101 based on load balancing factors, Quality of Service ("QoS") factors, or other factors. Service mesh 105 may provide (at 510) the updated public-private mapping information for namespace 101 to SMAMS 301, which may replace the previous public-private mapping information for namespace 101 (e.g., as received at 502) with the updated public-private mapping information for namespace 101.

SMAMS 301 may identify (at 512) that the updated public-private mapping information for namespace 101 is associated with the subscription of monitoring system 201 (at 504) to updates for the particular namespace 101 (and/or for one or more namespaces 101 having attributes, parameters, etc. that match attributes, parameters, etc. specified in the subscription). Based on identifying that the update to the public-private mapping information for namespace 101 is associated with the subscription of monitoring system 201, SMAMS 301 may provide (at 514) the updated public-private mapping information for namespace 101 to monitoring system 201. For example, SMAMS 301 may "push" the updated information to monitoring system 201, such that monitoring system 201 is notified in real time or near-real time of the updated public-private mapping information for namespace 101.

As discussed above, monitoring system 201 may "stitch" the updated public-private mapping information for namespace 101 to other information associated with namespace 101, such as performance metrics of traffic associated with namespace 101 (e.g., as determined based on a public IP address of namespace 101) and/or other analytics. Monitoring system 201 may use AI/ML techniques or other suitable techniques to identify trends, relationships, etc. between the public-private mapping information for namespace 101 (e.g., the updated public-private mapping information) and the performance metrics/analytics determined based on the public IP address. Monitoring system 201 and/or some other device or system may accordingly perform one or more remedial measures based on such "stitched" information, which may include notifying an operator of service mesh 105 of performance issues associated with a particular private IP address or set of IP addresses. Additionally, or alternatively, service mesh 105 may be associated with an API or other suitable communication pathway via which monitoring system 201 may provide such notifications, based on which service mesh 105 may automatically adjust configuration parameters associated with private IP addresses (e.g., routers, instances, etc. that provide network services and are associated with such private IP addresses) in order to remediate issues indicated by monitoring system 201.

Figure 6:
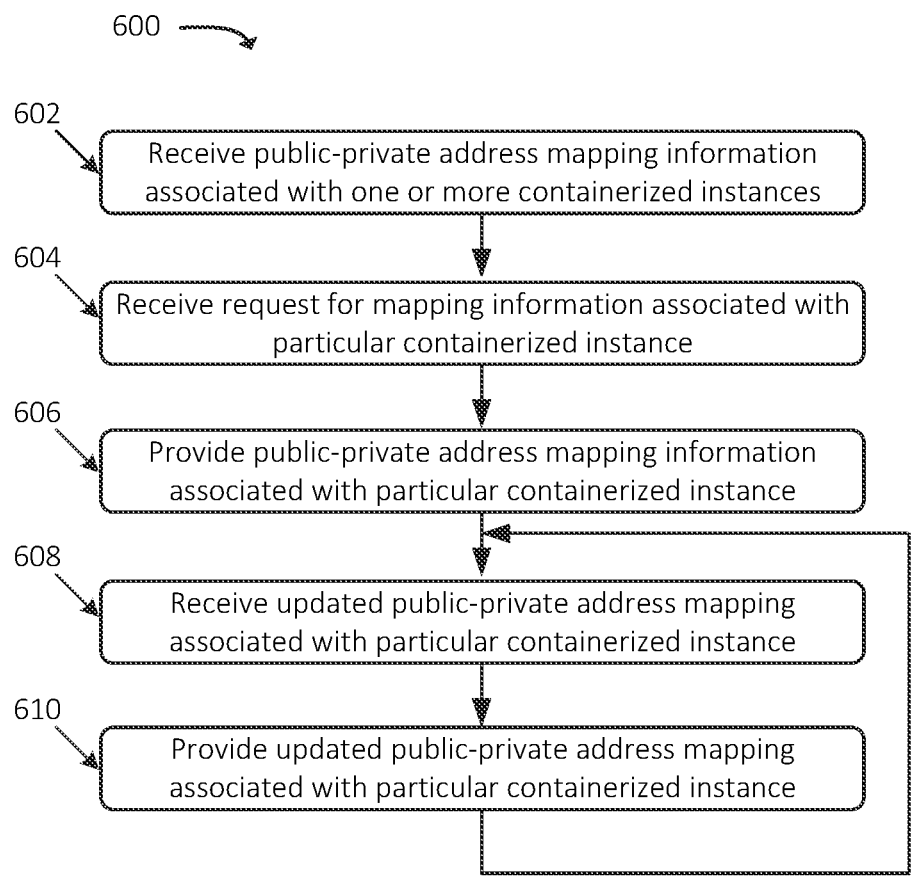
FIG. 6 illustrates an example process for providing updated address mapping information associated with a service mesh via which one or more containerized instances communicate, in accordance with some embodiments.

FIG. 6 illustrates an example process 600 for providing up-to-date public-private address mapping information associated with service mesh 105. In some embodiments, some or all of process 600 may be performed by SMAMS 301. In some embodiments, one or more other devices or systems may perform some or all of process 600 in concert with, and/or in lieu of, SMAMS 301.

As shown, process 600 may include receiving (at 602) public-private address mapping information associated with one or more containerized instances. For example, SMAMS 301 may receive public-private mapping information such as information mapping public IP addresses and/or ports, associated with one or more containerized instances, to private IP addresses and/or ports. The public-private mapping information may be received from service mesh 105, such as via an API associated with SMAMS 301. In some embodiments, service mesh 105 may communicate with SMAMS 301 in some other suitable manner.

As discussed above, the private addresses may include IP addresses, ports, etc. used by service mesh 105 to route traffic to and/or from particular containerized instances. The public addresses may include IP addresses, ports, etc. that are used by devices or systems that are external to service mesh 105 to communicate with the containerized instances. The containerized instances referred to above may include and/or may be implemented by one or more namespaces 101. For example, a group of containerized instances may be associated with a particular namespace 101. In such an example, the group of containerized instances may be associated with a particular public address and a particular private address. In another example, each containerized instance may be associated with a particular namespace, in which case each containerized instance may be associated with a particular public address and a particular private address.

Process 600 may further include receiving (at 604) a request for mapping information associated with a particular containerized instance. For example, monitoring system 201 may register, subscribe, and/or otherwise request mapping information associated with a particular containerized instance. The request may specify, for example, an identifier of a particular namespace 101, identifiers of a group of namespaces 101, attributes or keywords based on which a group of namespaces 101 may be identified, and/or other suitable information based on which one or more namespaces 101 and/or containerized instances may be identified. In some embodiments, SMAMS 301 may authenticate the request, and/or may determine whether monitoring system 201 is authorized to receive the requested mapping information.

Process 600 may additionally include providing (at 606) the public-private address mapping information associated with the particular containerized instance. For example, VNF 103 may provide, to monitoring system 201 based on receiving (at 604) the request, the previously received (at 602) public-private address mapping information associated with the particular containerized instance.

Process 600 may also include receiving (at 608) updated public-private address mapping information associated with the particular containerized instance. For example, at some point, service mesh 105 may modify the public-private address mapping information associated with the particular containerized instance, based on operations that may change the public and/or private address of the particular containerized instance. Such operations may include, for example, an orchestrator system associated with the particular containerized instance implementing the particular containerized instance on a different set of hardware, cloud, or virtual machine. Such operations may include service mesh 105 modifying parameters associated with routing traffic to and/or from the particular containerized instance, which may be performed based on the orchestrator modifying the particular containerized instance and/or based on load balancing or routing factors determined by service mesh 105.

Process 600 may further include providing (at 610) the updated public-private address mapping information associated with the particular containerized instance to monitoring system 201. In this manner, monitoring system 201 may be kept up-to-date on the public-private address mapping information associated with the particular containerized instance. Monitoring system 201 may thus be able to perform enhanced analytics on the particular containerized instance, such as by combining metrics related to the public address of the particular containerized instance (e.g., amount of throughput of traffic to and/or from the particular containerized instance, latency of traffic to and/or from the particular containerized instance, etc.) as well as with trends, attributes, etc. associated with the private address of the particular containerized instance. Monitoring system 201 may utilize AI/ML techniques or other suitable techniques to combine the metrics, analyze the combined metrics, determine one or more actions to perform with respect to the deployment of the containerized instance (e.g., whether to move the containerized instance to another set of hardware, cloud resources, virtual machine, etc., whether to allocate fewer or additional resources to the containerized instance, etc.), and/or whether to otherwise modify parameters of the containerized instance.

Figure 7:
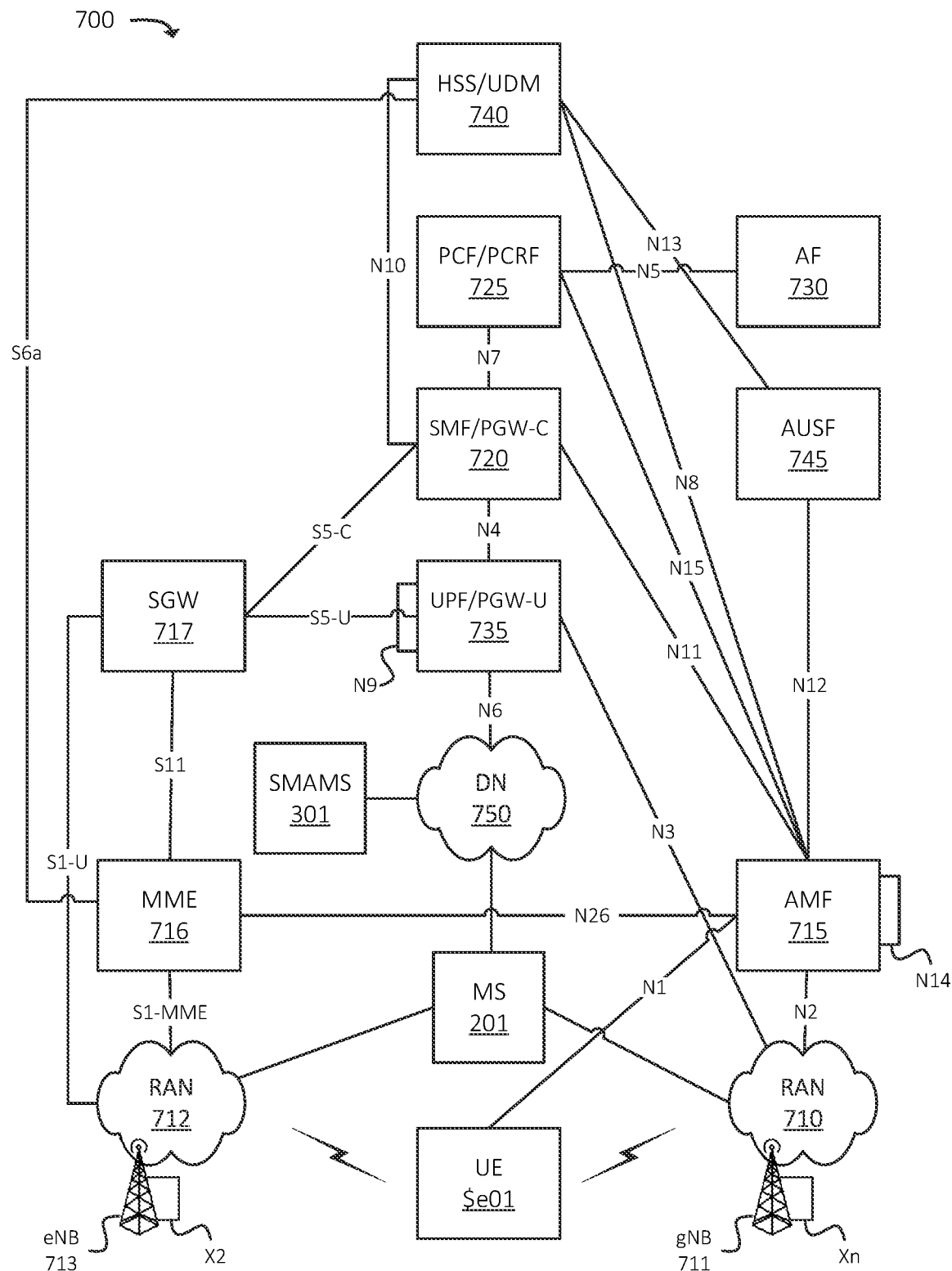
FIG. 7 illustrates an example environment in which one or more embodiments, described herein, may be implemented.

FIG. 7 illustrates an example environment 700, in which one or more embodiments may be implemented. In some embodiments, environment 700 may correspond to a Fifth Generation ("5G") network, and/or may include elements of a 5G network. In some embodiments, environment 700 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 700 may include UE 901, RAN 710 (which may include one or more Next Generation Node Bs ("gNBs") 711), RAN 712 (which may include one or more evolved Node Bs ("eNBs") 713), and various network functions such as Access and Mobility Management Function ("AMF") 715, Mobility Management Entity ("MME") 716, Serving Gateway ("SGW") 717, Session Management Function ("SMF")/Packet Data Network ("PDN") Gateway ("PGW")-Control plane function ("PGW-C") 720, Policy Control Function ("PCF")/Policy Charging and Rules Function ("PCRF") 725, Application Function ("AF") 730, User Plane Function ("UPF")/PGW-User plane function ("PGW-U") 735, Unified Data Management ("UDM")/Home Subscriber Server ("HSS") 740, and Authentication Server Function ("AUSF") 745. Environment 700 may also include one or more networks, such as Data Network ("DN") 750. In some embodiments, some or all of the elements of environment 700 may include, may be implemented by, and/or may be communicatively coupled to one or more namespaces 101. In some embodiments, some or all of the communication interfaces shown between such elements may be implemented by service mesh 105.

Environment 700 may include one or more additional devices or systems communicatively coupled to one or more networks (e.g., DN 750), such as monitoring system 201 and SMAMS 301 (e.g., where SMAMS 301 is communicatively coupled to service mesh 105 and/or DN 750).

The example shown in FIG. 7 illustrates one instance of each network component or function (e.g., one instance of SMF/PGW-C 720, PCF/PCRF 725, UPF/PGW-U 735, UDM/HSS 740, and/or AUSF 745). In practice, environment 700 may include multiple instances of such components or functions. For example, in some embodiments, environment 700 may include multiple "slices" of a core network, where each slice includes a discrete and/or logical set of network functions (e.g., one slice may include a first instance of SMF/PGW-C 720, PCF/PCRF 725, UPF/PGW-U 735, UDM/HSS 740, and/or AUSF 745, while another slice may include a second instance of SMF/PGW-C 720, PCF/PCRF 725, UPF/PGW-U 735, UDM/HSS 740, and/or AUSF 745). The different slices may provide differentiated levels of service, such as service in accordance with different Quality of Service ("QoS") parameters.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. Alternatively, or additionally, one or more of the devices of environment 700 may perform one or more network functions described as being performed by another one or more of the devices of environment 700. Devices of environment 700 may interconnect with each other and/or other devices via wired connections, wireless connections, or a combination of wired and wireless connections. In some implementations, one or more devices of environment 700 may be physically integrated in, and/or may be physically attached to, one or more other devices of environment 700.

UE 901 may include a computation and communication device, such as a wireless mobile communication device that is capable of communicating with RAN 710, RAN 712, and/or DN 750. UE 901 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 901 may send traffic to and/or receive traffic (e.g., user plane traffic) from DN 750 via RAN 710, RAN 712, and/or UPF/PGW-U 735.

RAN 710 may be, or may include, a 5G RAN that includes one or more base stations (e.g., one or more gNBs 711), via which UE 901 may communicate with one or more other elements of environment 700. UE 901 may communicate with RAN 710 via an air interface (e.g., as provided by gNB 711). For instance, RAN 710 may receive traffic (e.g., voice call traffic, data traffic, messaging traffic, signaling traffic, etc.) from UE 901 via the air interface, and may communicate the traffic to UPF/PGW-U 735, and/or one or more other devices or networks. Similarly, RAN 710 may receive traffic intended for UE 901 (e.g., from UPF/PGW-U 735, AMF 715, and/or one or more other devices or networks) and may communicate the traffic to UE 901 via the air interface.

RAN 712 may be, or may include, a LTE RAN that includes one or more base stations (e.g., one or more eNBs 713), via which UE 901 may communicate with one or more other elements of environment 700. UE 901 may communicate with RAN 712 via an air interface (e.g., as provided by eNB 713). For instance, RAN 710 may receive traffic (e.g., voice call traffic, data traffic, messaging traffic, signaling traffic, etc.) from UE 901 via the air interface, and may communicate the traffic to UPF/PGW-U 735, and/or one or more other devices or networks. Similarly, RAN 710 may receive traffic intended for UE 901 (e.g., from UPF/PGW-U 735, SGW 717, and/or one or more other devices or networks) and may communicate the traffic to UE 901 via the air interface.

AMF 715 may include one or more devices, systems, Virtualized Network Functions VNFs, Cloud-Native Network Functions ("CNFs"), etc., that perform operations to register UE 901 with the 5G network, to establish bearer channels associated with a session with UE 901, to hand off UE 901 from the 5G network to another network, to hand off UE 901 from the other network to the 5G network, manage mobility of UE 901 between RANs 710 and/or gNBs 711, and/or to perform other operations. In some embodiments, the 5G network may include multiple AMFs 715, which communicate with each other via the N14 interface (denoted in FIG. 7 by the line marked "N14" originating and terminating at AMF 715).

MME 716 may include one or more devices, systems, VNFs, CNFs, etc., that perform operations to register UE 901 with the EPC, to establish bearer channels associated with a session with UE 901, to hand off UE 901 from the EPC to another network, to hand off UE 901 from another network to the EPC, manage mobility of UE 901 between RANs 712 and/or eNBs 713, and/or to perform other operations.

SGW 717 may include one or more devices, systems, VNFs, CNFs, etc., that aggregate traffic received from one or more eNBs 713 and send the aggregated traffic to an external network or device via UPF/PGW-U 735. Additionally, SGW 717 may aggregate traffic received from one or more UPF/PGW-Us 735 and may send the aggregated traffic to one or more eNBs 713. SGW 717 may operate as an anchor for the user plane during inter-eNB handovers and as an anchor for mobility between different telecommunication networks or RANs (e.g., RANs 710 and 712).

SMF/PGW-C 720 may include one or more devices, systems, VNFs, CNFs, etc., that gather, process, store, and/or provide information in a manner described herein. SMF/PGW-C 720 may, for example, facilitate the establishment of communication sessions on behalf of UE 901. In some embodiments, the establishment of communications sessions may be performed in accordance with one or more policies provided by PCF/PCRF 725.

PCF/PCRF 725 may include one or more devices, systems, VNFs, CNFs, etc., that aggregate information to and from the 5G network and/or other sources. PCF/PCRF 725 may receive information regarding policies and/or subscriptions from one or more sources, such as subscriber databases and/or from one or more users (such as, for example, an administrator associated with PCF/PCRF 725).

AF 730 may include one or more devices, systems, VNFs, CNFs, etc., that receive, store, and/or provide information that may be used in determining parameters (e.g., quality of service parameters, charging parameters, or the like) for certain applications.

UPF/PGW-U 735 may include one or more devices, systems, VNFs, CNFs, etc., that receive, store, and/or provide data (e.g., user plane data). For example, UPF/PGW-U 735 may receive user plane data (e.g., voice call traffic, data traffic, etc.), destined for UE 901, from DN 750, and may forward the user plane data toward UE 901 (e.g., via RAN 710, SMF/PGW-C 720, and/or one or more other devices). In some embodiments, multiple UPFs 735 may be deployed (e.g., in different geographical locations), and the delivery of content to UE 901 may be coordinated via the N9 interface (e.g., as denoted in FIG. 7 by the line marked "N9" originating and terminating at UPF/PGW-U 735). Similarly, UPF/PGW-U 735 may receive traffic from UE 901 (e.g., via RAN 710, SMF/PGW-C 720, and/or one or more other devices), and may forward the traffic toward DN 750. In some embodiments, UPF/PGW-U 735 may communicate (e.g., via the N4 interface) with SMF/PGW-C 720, regarding user plane data processed by UPF/PGW-U 735.

UDM/HSS 740 and AUSF 745 may include one or more devices, systems, VNFs, CNFs, etc., that manage, update, and/or store, in one or more memory devices associated with AUSF 745 and/or UDM/HSS 740, profile information associated with a subscriber. AUSF 745 and/or UDM/HSS 740 may perform authentication, authorization, and/or accounting operations associated with the subscriber and/or a communication session with UE 901.

DN 750 may include one or more wired and/or wireless networks. For example, DN 750 may include an Internet Protocol ("IP")-based PDN, a wide area network ("WAN") such as the Internet, a private enterprise network, and/or one or more other networks. UE 901 may communicate, through DN 750, with data servers, other UEs 901, and/or to other servers or applications that are coupled to DN 750. DN 750 may be connected to one or more other networks, such as a public switched telephone network ("PSTN"), a public land mobile network ("PLMN"), and/or another network. DN 750 may be connected to one or more devices, such as content providers, applications, web servers, and/or other devices, with which UE 901 may communicate. In some embodiments, DN 750 may be, may include, and/or may be included in, network 109.

Figure 8:
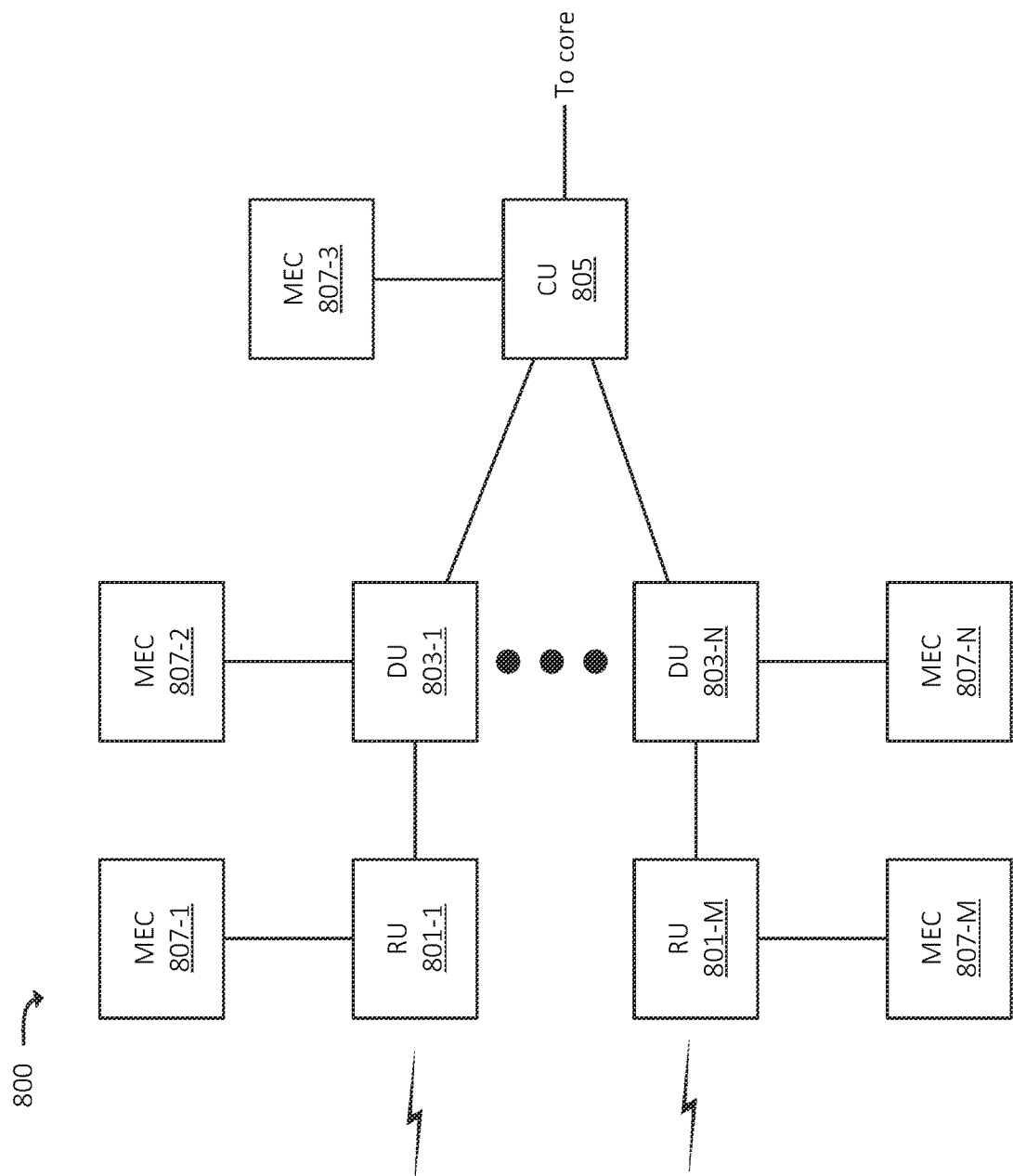
FIG. 8 illustrates an example arrangement of a radio access network ("RAN"), in accordance with some embodiments.

FIG. 8 illustrates an example Distributed Unit ("DU") network 800, which may be included in and/or implemented by one or more RANs (e.g., RAN 710, RAN 712, or some other RAN). In some embodiments, a particular RAN may include one DU network 800. In some embodiments, a particular RAN may include multiple DU networks 800. In some embodiments, DU network 800 may correspond to a particular gNB 711 of a 5G RAN (e.g., RAN 710). In some embodiments, DU network 800 may correspond to multiple gNBs 711. In some embodiments, DU network 800 may correspond to one or more other types of base stations of one or more other types of RANs. As shown, DU network 800 may include Central Unit ("CU") 805, one or more Distributed Units ("DUs") 803-1 through 803-N (referred to individually as "DU 803," or collectively as "DUs 803"), and one or more Radio Units ("RUs") 801-1 through 801-M (referred to individually as "RU 801," or collectively as "RUs 801").

CU 805 may communicate with a core of a wireless network (e.g., may communicate with one or more of the devices or systems described above with respect to FIG. 7, such as AMF 715 and/or UPF/PGW-U 735). In the uplink direction (e.g., for traffic from UEs 901 to a core network), CU 805 may aggregate traffic from DUs 803, and forward the aggregated traffic to the core network. In some embodiments, CU 805 may receive traffic according to a given protocol (e.g., Radio Link Control ("RLC")) from DUs 803, and may perform higher-layer processing (e.g., may aggregate/process RLC packets and generate Packet Data Convergence Protocol ("PDCP") packets based on the RLC packets) on the traffic received from DUs 803.

In accordance with some embodiments, CU 805 may receive downlink traffic (e.g., traffic from the core network) for a particular UE 901, and may determine which DU(s) 803 should receive the downlink traffic. DU 803 may include one or more devices that transmit traffic between a core network (e.g., via CU 805) and UE 901 (e.g., via a respective RU 801). DU 803 may, for example, receive traffic from RU 801 at a first layer (e.g., physical ("PHY") layer traffic, or lower PHY layer traffic), and may process/aggregate the traffic to a second layer (e.g., upper PHY and/or RLC). DU 803 may receive traffic from CU 805 at the second layer, may process the traffic to the first layer, and provide the processed traffic to a respective RU 801 for transmission to UE 901.

RU 801 may include hardware circuitry (e.g., one or more RF transceivers, antennas, radios, and/or other suitable hardware) to communicate wirelessly (e.g., via an RF interface) with one or more UEs 901, one or more other DUs 803 (e.g., via RUs 801 associated with DUs 803), and/or any other suitable type of device. In the uplink direction, RU 801 may receive traffic from UE 901 and/or another DU 803 via the RF interface and may provide the traffic to DU 803. In the downlink direction, RU 801 may receive traffic from DU 803, and may provide the traffic to UE 901 and/or another DU 803.

RUs 801 may, in some embodiments, be communicatively coupled to one or more Multi-Access/Mobile Edge Computing ("MEC") devices, referred to sometimes herein simply as "MECs" 807. For example, RU 801-1 may be communicatively coupled to MEC 807-1, RU 801-M may be communicatively coupled to MEC 807-M, DU 803-1 may be communicatively coupled to MEC 807-2, DU 803-N may be communicatively coupled to MEC 807-N, CU 805 may be communicatively coupled to MEC 807-3, and so on. MECs 807 may include hardware resources (e.g., configurable or provisionable hardware resources) that may be configured to provide services and/or otherwise process traffic to and/or from UE 901, via a respective RU 801.

For example, RU 801-1 may route some traffic, from UE 901, to MEC 807-1 instead of to a core network (e.g., via DU 803 and CU 805). MEC 807-1 may process the traffic, perform one or more computations based on the received traffic, and may provide traffic to UE 901 via RU 801-1. In this manner, ultra-low latency services may be provided to UE 901, as traffic does not need to traverse DU 803, CU 805, and an intervening backhaul network between DU network 800 and the core network. In some embodiments, MEC 807 may include, and/or may implement, some or all of the functionality described above with respect to namespace 101, monitoring system 201, SMAMS 301, UPF 735, and/or one or more other devices, systems, VNFs, CNFs, etc.

Figure 9:
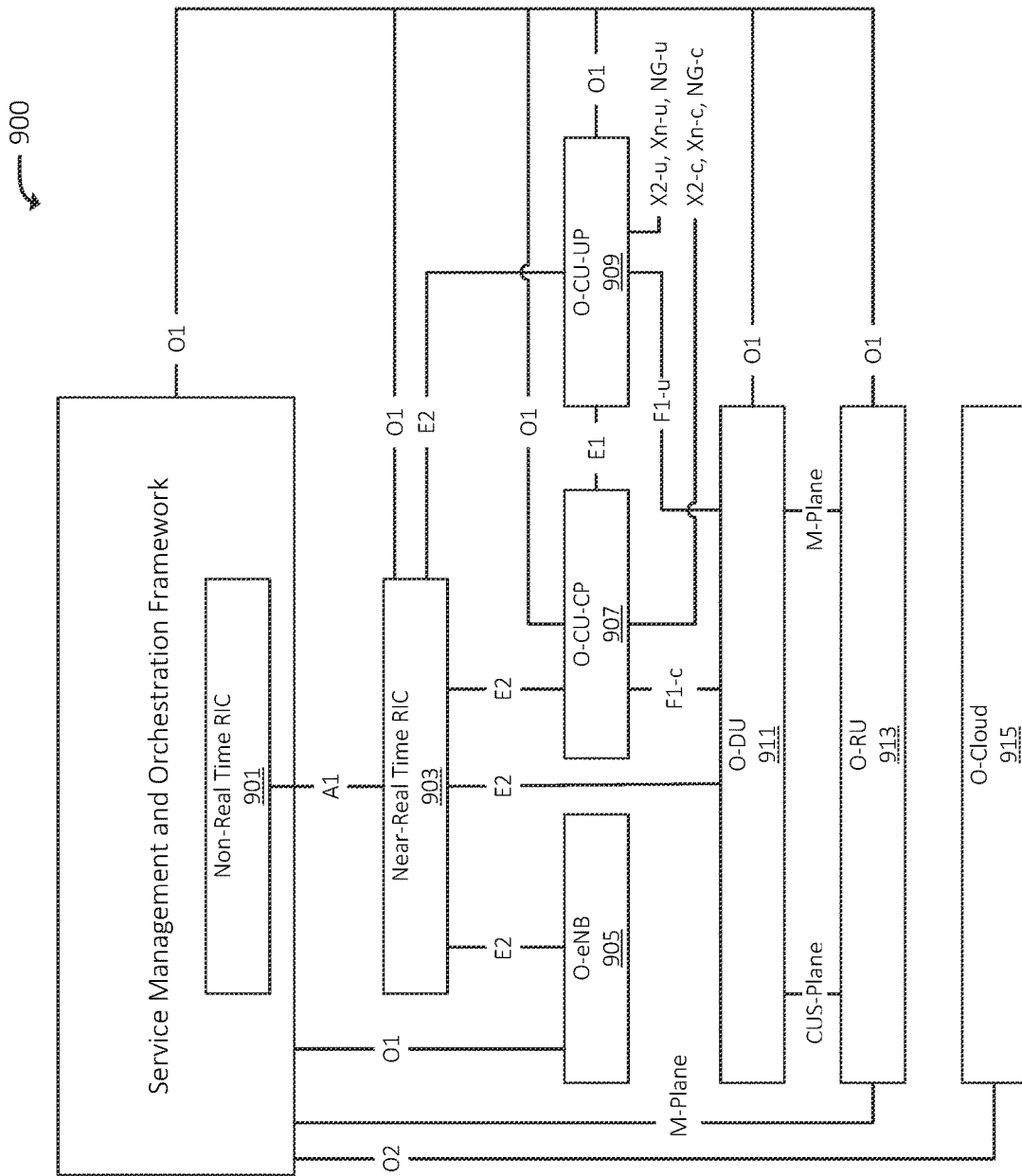
FIG. 9 illustrates an example arrangement of an Open RAN ("O-RAN") environment in which one or more embodiments, described herein, may be implemented.

FIG. 9 illustrates an example O-RAN environment 900, which may correspond to RAN 710, RAN 712, and/or DU network 800. For example, RAN 710, RAN 712, and/or DU network 800 may include one or more instances of O-RAN environment 900, and/or one or more instances of O-RAN environment 900 may implement RAN 710, RAN 712, DU network 800, and/or some portion thereof. As shown, O-RAN environment 900 may include Non-Real Time Radio Intelligent Controller ("RIC") 901, Near-Real Time RIC 903, O-eNB 905, O-CU-Control Plane ("O-CU-CP") 907, O-CU-User Plane ("O-CU-UP") 909, O-DU 911, O-RU 913, and O-Cloud 915. In some embodiments, O-RAN environment 900 may include additional, fewer, different, and/or differently arranged components.

In some embodiments, some or all of the elements of O-RAN environment 900 may be implemented by one or more configurable or provisionable resources, such as virtual machines, cloud computing systems, physical servers, and/or other types of configurable or provisionable resources. In some embodiments, some or all of O-RAN environment 900 may be implemented by, and/or communicatively coupled to, one or more MECs 807. In some embodiments, one or more namespaces 101 may be associated with and/or may implement one or more of the elements of O-RAN environment 900.

Non-Real Time MC 901 and Near-Real Time MC 903 may receive performance information (and/or other types of information) from one or more sources, and may configure other elements of O-RAN environment 900 based on such performance or other information. For example, Near-Real Time RIC 903 may receive performance information, via one or more E2 interfaces, from O-eNB 905, O-CU-CP 907, and/or O-CU-UP 909, and may modify parameters associated with O-eNB 905, O-CU-CP 907, and/or O-CU-UP 909 based on such performance information. Similarly, Non-Real Time RIC 901 may receive performance information associated with O-eNB 905, O-CU-CP 907, O-CU-UP 909, and/or one or more other elements of O-RAN environment 900 and may utilize machine learning and/or other higher level computing or processing to determine modifications to the configuration of O-eNB 905, O-CU-CP 907, O-CU-UP 909, and/or other elements of O-RAN environment 900. In some embodiments, Non-Real Time RIC 901 may generate machine learning models based on performance information associated with O-RAN environment 900 or other sources, and may provide such models to Near-Real Time RIC 903 for implementation.

O-eNB 905 may perform functions similar to those described above with respect to eNB 713. For example, O-eNB 905 may facilitate wireless communications between UE 901 and a core network. O-CU-CP 907 may perform control plane signaling to coordinate the aggregation and/or distribution of traffic via one or more DUs 803, which may include and/or be implemented by one or more O-DUs 911, and O-CU-UP 909 may perform the aggregation and/or distribution of traffic via such DUs 803 (e.g., O-DUs 911). O-DU 911 may be communicatively coupled to one or more RUs 801, which may include and/or may be implemented by one or more O-RUs 913. In some embodiments, O-Cloud 915 may include or be implemented by one or more MECs 807, which may provide services, and may be communicatively coupled, to O-CU-CP 907, O-CU-UP 909, O-DU 911, and/or O-RU 913 (e.g., via an O1 and/or O2 interface).

Figure 10:
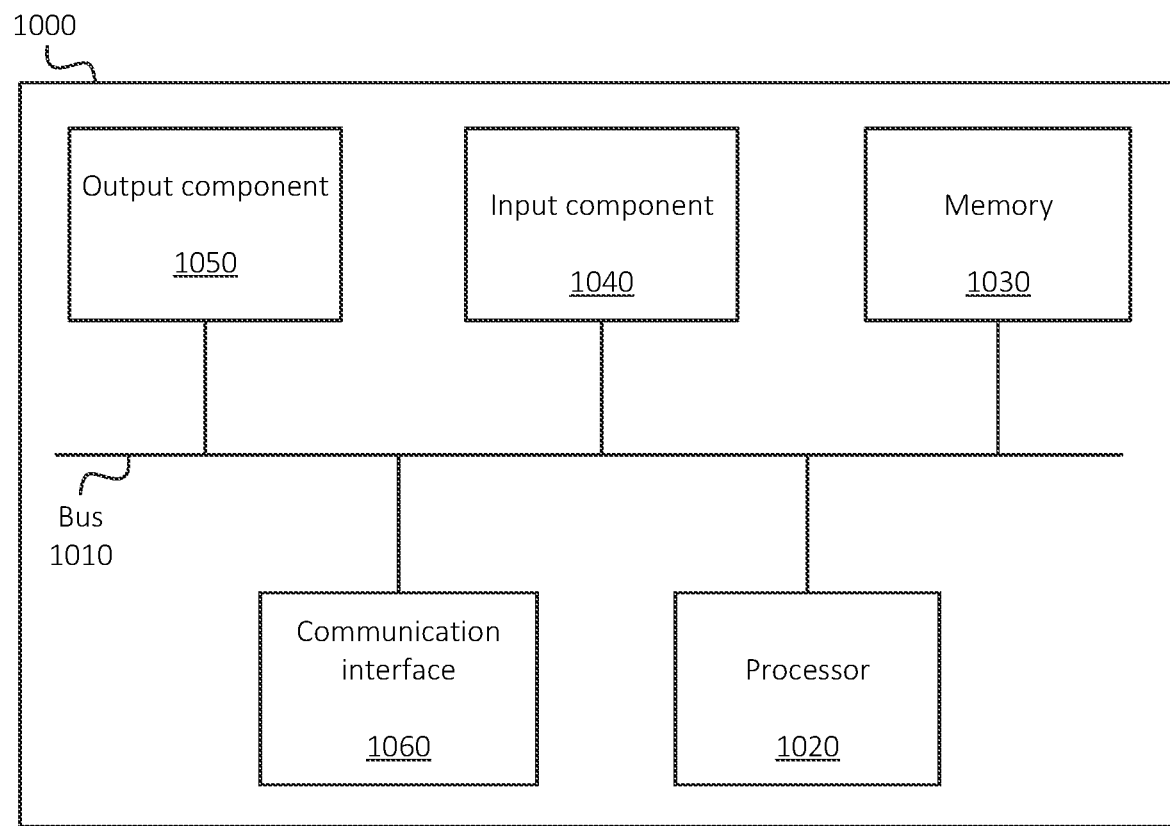
FIG. 10 illustrates example components of one or more devices, in accordance with one or more embodiments described herein.

FIG. 10 illustrates example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. In some embodiments, processor 1020 may be or may include one or more hardware processors. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000 and/or other receives or detects input from a source external to 1040, such as a touchpad, a touchscreen, a keyboard, a keypad, a button, a switch, a microphone or other audio input component, etc. In some embodiments, input component 1040 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-6), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
receive, from a service mesh that provides communication services to a plurality of containerized instances, a first mapping between:
a public address associated with communications between a particular containerized instance and a network, and
a first private address associated with communications between the particular containerized instance and the service mesh;
receive, from a particular system, a request for address mapping information associated with the particular containerized instance;
provide, to the particular system and based on the request, the first private address associated with the particular containerized instance;
receive, from the service mesh, a second mapping between:
the public address associated with the particular containerized instance, and
a second private address associated with communications between the particular containerized instance and the service mesh; and
provide, to the particular system, based on the request, and further based on receiving the second mapping, the second private address associated with the particular containerized instance.

2. The device of claim 1, wherein providing the second private address to the particular system is performed with receiving a subsequent request from the particular system.

3. The device of claim 1, wherein providing the second private address includes pushing the second private address to the particular system based on receiving the second mapping from the service mesh.

4. The device of claim 1, wherein receiving the first and second private addresses includes receiving the first and second mappings via an application programming interface ("API") with which the service mesh is associated.

5. The device of claim 1, wherein providing the first and second private addresses to the particular system includes providing an indication that the first and second private addresses are associated with the public address.

6. The device of claim 1, wherein the first private address includes at least one of a first Internet Protocol ("IP") address or a first port, and wherein the second private address includes at least one of a second IP address or a second port.

7. The device of claim 1, wherein the particular containerized instance includes a namespace associated with the service mesh.

8. A non-transitory computer-readable medium, storing a plurality of processor-executable instructions to:
receive, from a service mesh that provides communication services to a plurality of containerized instances, a first mapping between:
a public address associated with communications between a particular containerized instance and a network, and
a first private address associated with communications between the particular containerized instance and the service mesh;
receive, from a particular system, a request for address mapping information associated with the particular containerized instance;
provide, to the particular system and based on the request, the first private address associated with the particular containerized instance;
receive, from the service mesh, a second mapping between:
the public address associated with the particular containerized instance, and
a second private address associated with communications between the particular containerized instance and the service mesh; and
provide, to the particular system, based on the request, and further based on receiving the second mapping, the second private address associated with the particular containerized instance.

9. The non-transitory computer-readable medium of claim 8, wherein providing the second private address to the particular system is performed with receiving a subsequent request from the particular system.

10. The non-transitory computer-readable medium of claim 8, wherein providing the second private address includes pushing the second private address to the particular system based on receiving the second mapping from the service mesh.

11. The non-transitory computer-readable medium of claim 8, wherein receiving the first and second private addresses includes receiving the first and second mappings via an application programming interface ("API") with which the service mesh is associated.

12. The non-transitory computer-readable medium of claim 8, wherein providing the first and second private addresses to the particular system includes providing an indication that the first and second private addresses are associated with the public address.

13. The non-transitory computer-readable medium of claim 8, wherein the first private address includes at least one of a first Internet Protocol ("IP") address or a first port, and wherein the second private address includes at least one of a second IP address or a second port.

14. The non-transitory computer-readable medium of claim 8, wherein the particular containerized instance includes a namespace associated with the service mesh.

15. A method, comprising:
receiving, from a service mesh that provides communication services to a plurality of containerized instances, a first mapping between:

a public address associated with communications between a particular containerized instance and a network, and a first private address associated with communications between the particular containerized instance and the service mesh;

receiving, from a particular system, a request for address mapping information associated with the particular containerized instance;

providing, to the particular system and based on the request, the first private address associated with the particular containerized instance;

receiving, from the service mesh, a second mapping between:

the public address associated with the particular containerized instance, and a second private address associated with communications between the particular containerized instance and the service mesh; and providing, to the particular system, based on the request, and further based on receiving the second mapping, the second private address associated with the particular containerized instance.

16. The method of claim 15, wherein providing the second private address to the particular system is performed with receiving a subsequent request from the particular system.

17. The method of claim 15, wherein providing the second private address includes pushing the second private address to the particular system based on receiving the second mapping from the service mesh.

18. The method of claim 15, wherein receiving the first and second private addresses includes receiving the first and second mappings via an application programming interface ("API") with which the service mesh is associated.

19. The method of claim 15, wherein providing the first and second private addresses to the particular system includes providing an indication that the first and second private addresses are associated with the public address.

20. The method of claim 15, wherein the first private address includes at least one of a first Internet Protocol ("IP") address or a first port, and wherein the second private address includes at least one of a second IP address or a second port.

* * * * *